(12) United States Patent
Wang et al.

(10) Patent No.: US 11,182,155 B2
(45) Date of Patent: Nov. 23, 2021

(54) DEFECT DESCRIPTION GENERATION FOR A SOFTWARE PRODUCT

(71) Applicant: INTERNATIONAL BUSINESS MACHINES CORPORATION, Armonk, NY (US)

(72) Inventors: LinBo Wang, Xian (CN); Chong Liu, Xian (CN); Juan Wu, Xian (CN)

(73) Assignee: International Business Machines Corporation, Armonk, NY (US)

(*) Notice: Subject to any disclaimer, the term of this patent is extended or adjusted under 35 U.S.C. 154(b) by 67 days.

(21) Appl. No.: 16/508,378

(22) Filed: Jul. 11, 2019

(65) Prior Publication Data
US 2021/0011713 A1   Jan. 14, 2021

(51) Int. Cl.
G06F 9/44      (2018.01)
G06F 8/73     (2018.01)
G06F 40/279   (2020.01)

(52) U.S. Cl.
CPC .............. G06F 8/73 (2013.01); G06F 40/279 (2020.01)

(58) Field of Classification Search
CPC ........................................................ G06F 8/73
USPC ........................................................ 717/123
See application file for complete search history.

(56) References Cited

U.S. PATENT DOCUMENTS

| 8,265,925 | B2* | 9/2012 | Aarskog | G06F 40/211 |
| | | | | 704/9 |
| 8,291,373 | B2* | 10/2012 | Gibbs | G06F 8/315 |
| | | | | 717/106 |
| 8,875,110 | B2* | 10/2014 | Lee | G06F 11/3604 |
| | | | | 717/142 |
| 9,535,579 | B2* | 1/2017 | Hsiao | G06F 3/04817 |
| 2011/0083123 | A1* | 4/2011 | Lou | G06F 11/0706 |
| | | | | 717/125 |

(Continued)

FOREIGN PATENT DOCUMENTS

| CN | 106649223 A | 5/2017 |
| CN | 112214393 A | 1/2021 |

OTHER PUBLICATIONS

Canli, "Automatic summary generation based on improved HMM", Dissertation, Zhejiang University Technology, 2017, [retrieved on May 28, 2019], 5 pages, Retrieved from the Internet <URL: http://cdmd.cnki.com.cn/Article/CDMD-10338-1017042985.htm>.

(Continued)

Primary Examiner — Evral E Bodden
(74) Attorney, Agent, or Firm — Steven M. Bouknight

(57) ABSTRACT

The present invention provides a method, computer system and computer program product for generating a defect description. According to the method, one or more keywords from a user for depicting a defect encountered when using a software product are received. A search for one or more terms matching at least one of the keywords and a path corresponding to the one or more terms in an operation map is conducted, wherein the operation map includes terms and paths describing all possible operations of a software product based on a user interface of the software product. And in response to the one or more terms matching the at least one of the keywords and a corresponding path are searched out, a defect description based on the one or more matched terms, the corresponding path and the received keywords is generated.

12 Claims, 8 Drawing Sheets

(56) References Cited

U.S. PATENT DOCUMENTS

| | | | |
|---|---|---|---|
| 2011/0219360 A1* | 9/2011 | Srinivasa | G06F 16/00 |
| | | | 717/124 |
| 2014/0074457 A1 | 3/2014 | Masuda | |
| 2014/0316700 A1* | 10/2014 | Zheng | G05D 1/0217 |
| | | | 701/533 |
| 2017/0132724 A1* | 5/2017 | Aqlan | G06Q 10/063112 |

OTHER PUBLICATIONS

Conroy, et al., "Text summarization via hidden Markov models", SIGIR '01, Sep. 9-12, 2001, pp. 406-407, New Orleans, Louisiana, USA, ACM 1-58113-331-6/01/0009.

Mell et al., "The NIST Definition of Cloud Computing", National Institute of Standards and Technology, Special Publication 800-145, Sep. 2011, pp. 1-7.

Shang, et al., "Neural Responding Machine for Short-Text Conversation", Noah's Ark Lab, Apr. 27, 2015, 12 Pages, Huawei Technologies Co. Ltd., Sha Tin, Hong Kong, CN.

\* cited by examiner

DEFECT DESCRIPTION GENERATION FOR A SOFTWARE PRODUCT

BACKGROUND

The present invention generally relates to defect description, and more specifically, relates to generate a defect description for a software product.

Defects or errors may be encountered in the developing, testing and even supporting phases of a software product. For example, a supporter may receive feedback from a user, a QA tester may find a software product error while testing, and a developer may find a error during development.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment of the present invention, there is provided a computer implemented method in which one or more keywords from a user for depicting a defect encountered when using a software product are received. A search for one or more terms matching at least one of the keywords and a path corresponding to the one or more terms in an operation map is conducted, wherein the operation map includes terms and paths describing all possible operations of a software product based on a user interface of the software product. Furthermore, in response to finding the one or more terms matching the at least one of the keywords and a corresponding path, a defect description based on the one or more matched terms, the corresponding path and the received keywords is generated.

Other embodiments and aspects including, but not limited to, computer systems and computer program products, are described in detail herein and are considered a part of the claimed invention.

These and other features and advantages of the present invention are described and/or become apparent to those of ordinary skill in the art in view of the following detailed description of the example embodiments of the present invention.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
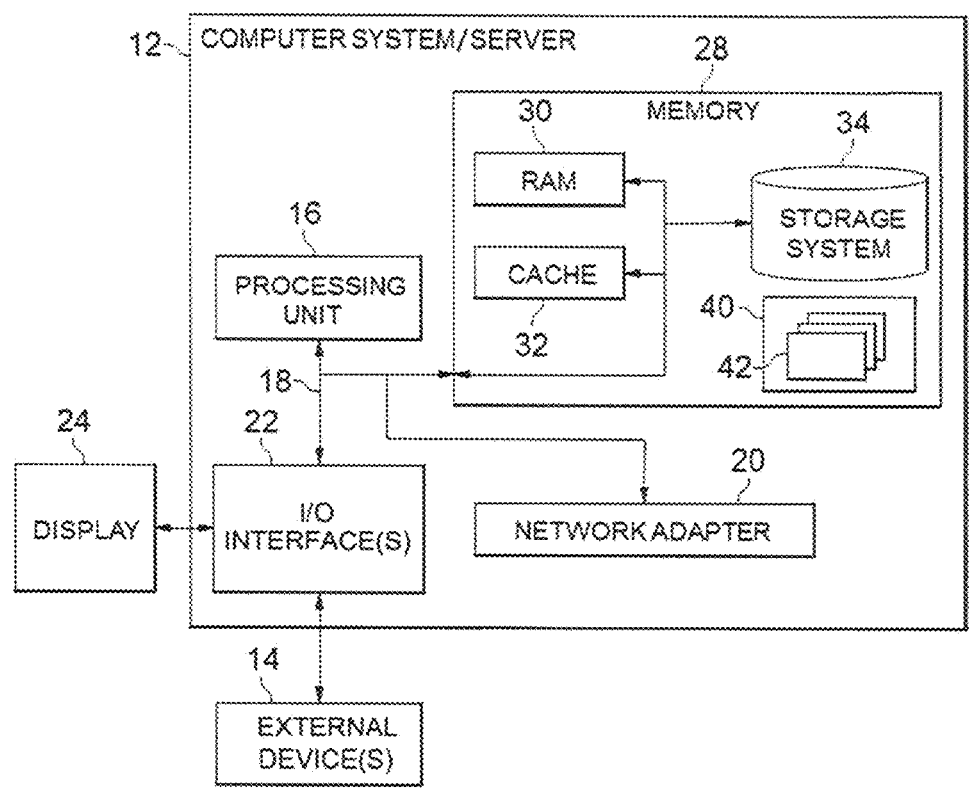
FIG. 1 depicts a cloud computing node according to an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
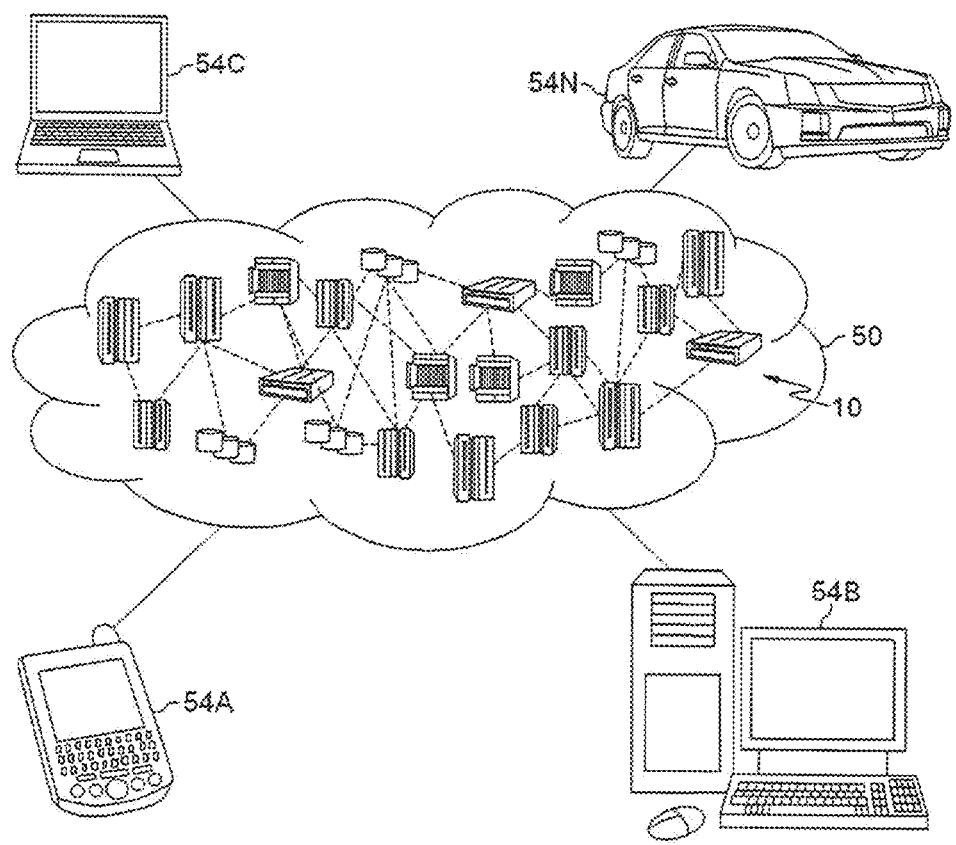
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
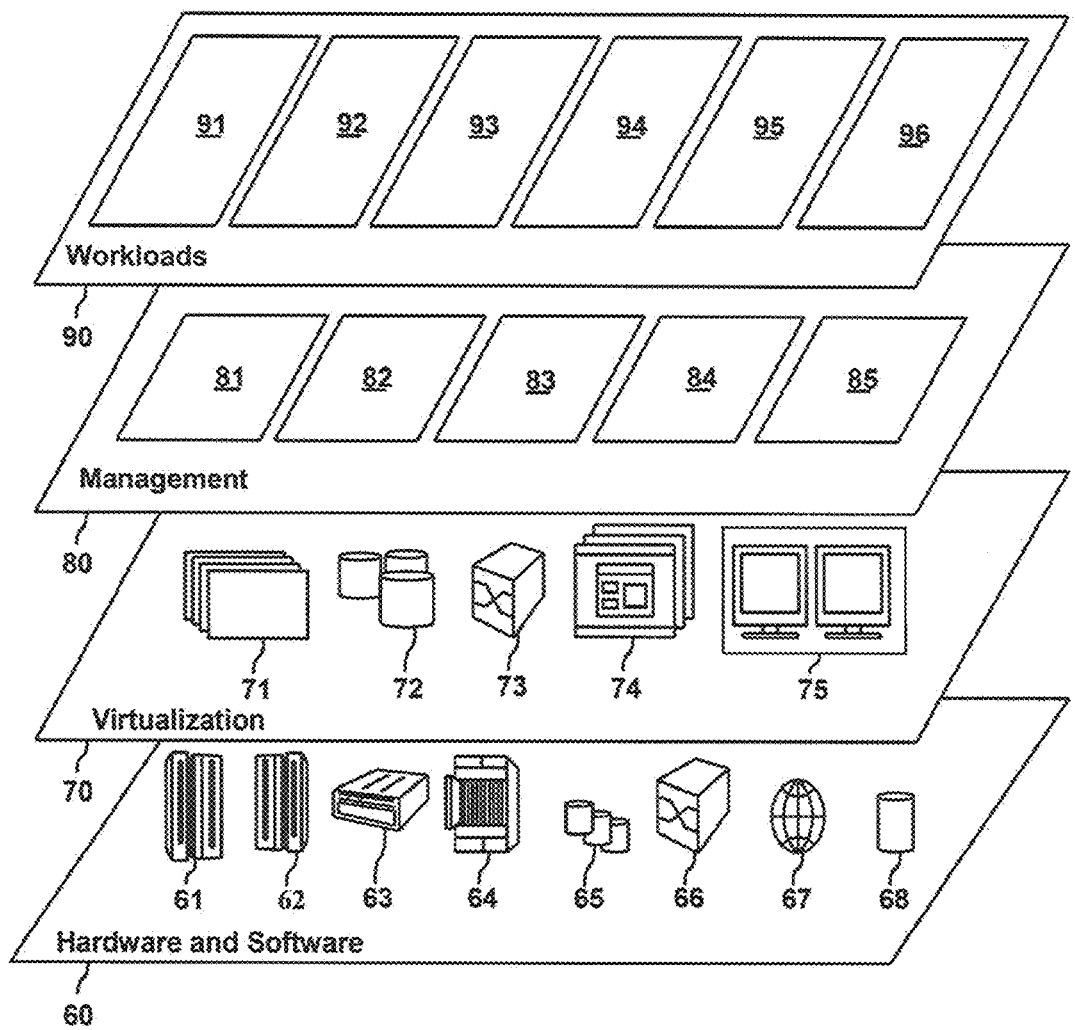
FIG. 3 depicts model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and defect description processing 96 according to embodiments of this invention.

It should be noted that the processing of defect description according to embodiments of this invention could be implemented by computer system/server 12 of FIG. 1.

As previously described, defects and/or errors may be encountered in the developing, testing and even supporting phases of a software product. Therefore, there is need to generate and present information on software product defects/errors in a standardized and efficient way. Existing ways of generating defect information include manual or automatic methods. Certainly, ways of manually recording a defect, such as filling in an Excel form or a template for managing errors are time-consuming and labor-intensive. It is preferred to let the computer describe a defect automatically, for example, a method of the computer automatically recording a log of error. By using this method, accurate information about errors could be obtained, but since the log of the defect is based on the code level, the information may be hard to understand and only plays a supplementary role in error-fixing process. There are other automatic error reporting tools that may automatically detect errors and generate error reports. However, these kinds of tools only detect the application exceptions or errors that terminate the program during testing stage and could not automatically detect functional errors. With the development of artificial intelligence technology, there are also methods which may automatically complete the detection or generate text to describe defects based on images or speech illustrating the problems. All of these existing ways lack solution that takes advantage of the user interface and is only based on a few keywords entered by a user to generate a defect description.

Defect description generation and presentation in embodiments of the present invention may include reproducing operational steps that occur before the defect is encountered by a user. Embodiments of the present invention may take advantage of a user interface of a software product, and in one embodiment may generate defect description information based on received user input (i.e. keywords) using the interactive user interface. Embodiments of the present invention may automatically generate the operational steps which occurred before the defect based on a predefined operation map of a software product with a structured user interface or desktop.

The operation map of a software product is pre-defined based on a user interface of the software product with a structured user interface or desktop and is specific to the software product. It is known that, for a software product with a structured graphical user interface, windows, icons or buttons, and other graphics displayed in the user interface may represent different actions or functions, and a user may select any one by using a pointing device such as a mouse to perform various operations. Generally speaking, a user may begin from any button in the home page to any other button in any page to complete various operations. The operations may occur in order/sequence or in parallel. In fact, the operations are a series of processes that include clicking on buttons or the like in sequence to perform the function or action for different purposes. A term may be used to represent the name, the function, the action or the like of operations and a path may be used to represent the sequence or process of operations. All possible operations of a software product may be reproduced or expressed in terms and paths, and all the terms and paths for the software product may form a map which is referred to as operation map herein. These terms may also be referred to as nodes in the operation map. It is to be pointed out that the operation map may be a visual presentation of the various operations based on a user interface of a software product.

Figure 4:
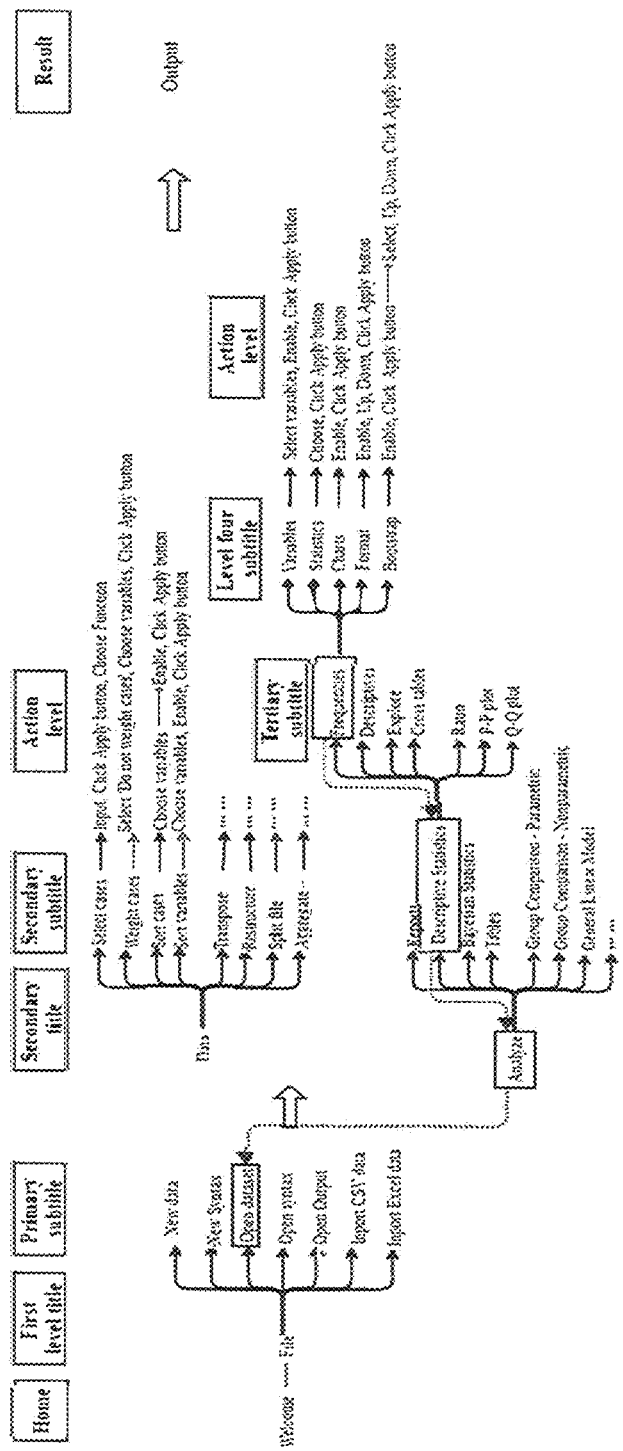
FIG. 4 illustrates an example of operation map according to an embodiment of the present invention.

With reference now to FIG. 4, which illustrates an example of operation map according to an embodiment of the present invention. The operation map shown in FIG. 4 may be pre-defined/created for a certain software product. Any software product with an interactive user interface is suitable for the method of the present invention to create an operation map. In the operation map created, "Home", "First level title", "primary subtitle", "secondary title", "Secondary subtitle", "Action level" and "Result" represent different hierarchies. In other words, the "Home" represents the first page, "First level title" represents the second page, "primary subtitle" represents the third page, and so on and there is a logical sequence between them. The nodes under the respective hierarchy are the terms indicating the functions or actions or the like for different purposes of the operations. The parallel nodes could be performed in parallel and the nodes from left to right could be performed in order from left to right according to the arrow's direction. For example, if a user is going to perform the action "Select variables", he/she may begin from "Welcome" interface in Home page, next clicks "File", "Open dataset", "Analyze", "Descriptive Statistics", "Frequencies", "Variables" in sequence, and then perform the action "Select variables". Thus "File", "Open dataset", "Analyze", "Descriptive Statistics", "Frequencies", "Variables" are the related terms, and the process or sequence forms a corresponding path that is related to these terms.

Embodiments of the present invention are based on the above pre-defined operation map and may provide a user with the ability to find the defect associated with a function or action based on the user interface, for example, a button could not work, a file could not be imported, and so on.

In the following, embodiments of the invention will be described in detail with reference to FIGS. 5, 6, 7, and 8 on how to generate and present the defect description information based on the user interface.

Figure 5:
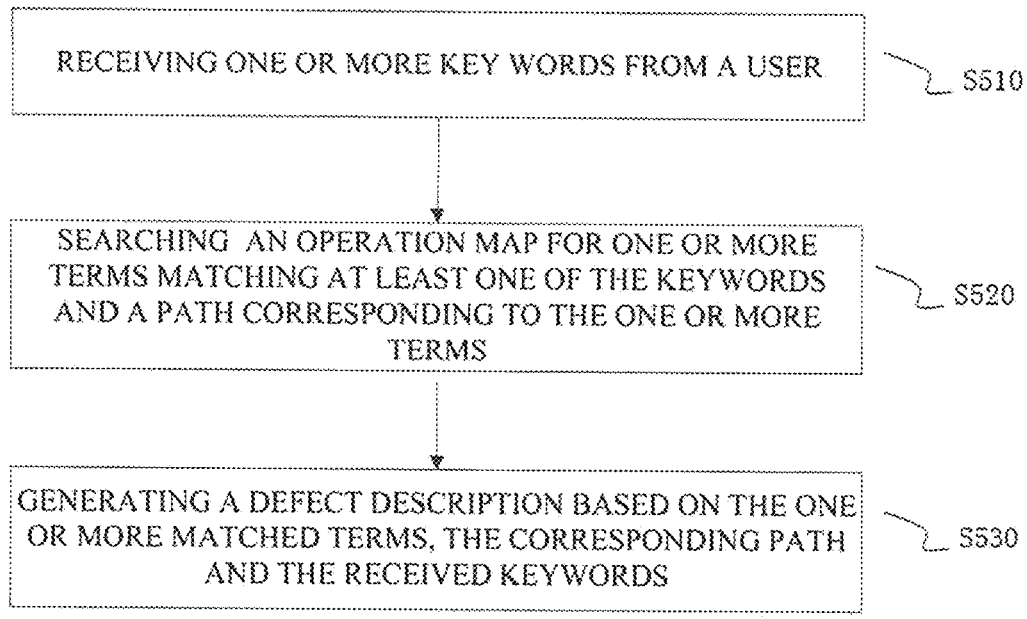
FIG. 5 illustrates a flowchart of an example method according to an embodiment of the present invention.

Referring now to FIG. 5, in which a flowchart of an exemplary method according to an embodiment of the present invention is shown.

The method starts at step S510 and proceeds to step S530. At step S510, one or more keywords from a user for depicting a defect encountered when using a software product are received. The user may be a developer, a tester, a supporter, a terminal user and so on. The keywords from a user may be obtained in any form, for example, by way of a questionnaire. The questionnaire may have been designed based on the operation map, so that at least one of the expected keywords/answers to the questions from the user in the questionnaire is matched to a term in the operation map. The keywords may be filled or selected by the user in a questionnaire based on the defect/problem the user encountered. The content of questions and format of the questionnaire are not limited. For example, the questions may include "what are you using?", "what interface are you under?" and/or "What function and tab are you under?" and "What problem you encountered?" etc. . . . . . As far as the format, any proper way may be employed, such as asking the user to input the answer, or providing the user with terms in the operation map and requesting the user to make a selection. Following is an example of a questionnaire together with the keywords input/entered by the user. The example is specific to a certain software product of which operation map is shown in FIG. 4 and will be used throughout the present invention.

a. What dataset are you using now?
Employee dataset.csv
b. What function and tab are you under now? Or what interface are you under now?
Frequencies, Statistics
c. What problem do you encountered?
Name option result
Up button can't work <None>

For above example, assuming that the keywords "Employee dataset.csv, Frequencies, Statistics, Up button can't work" are received from the user, then the method proceeds to step S520, in which a search in an operation map for one or more terms matching at least one of the keywords and a path corresponding to the one or more terms is conducted. The operation map includes terms and paths describing all possible operations of a software product based on a user interface of the software product. The operation map may be pre-defined in advance and ready for the subsequent use instead of being defined each time. The operation map has already been discussed above and the example of the operation map is provided in FIG. 4. In the above example, the keywords "Employee dataset.csv, Frequencies, Statistics, Up button can't work" are used to search in FIG. 4. As can be seen by the dotted arrow line in the operation map, the terms "dataset, Analyze, Descriptive Statistics, and Frequencies," and a path and related terms that correspond to the terms are determined. For example, the path may be determined to start from the welcome interface and end at the user's current interface, with one or more intermediate interfaces possibly in between, and the one or more determined or related terms are the nodes in the path. It is to be pointed out that the related terms may be the same or similar to the keywords received from the user due to the difference in expression of the same thing, for example, "dataset" is similar to "Employee dataset.csv" in expression but they mean the same. It is not necessary that all the keywords are searched out in the operation map. In general, the keywords regarding the name of the application, the function, the tab and/or the interface which are the same or similar to the nodes in the operation map will be found. The part of the problem description, such as "Up button can't work" may not be found out and the complete information regarding the problem mainly depends on user's input.

Searching for and determining the related terms and the corresponding path in the operation map may be completed by using, for example, an A* (A star) algorithm. The A* algorithm is a search algorithm used for shortest path search and graph traversal to find paths between multiple "nodes".

Then, the method proceeds to step S530 whereby, in response to the one or more received terms/keywords matching at least one of the related terms and a corresponding path, defect description information is generated based on the one or more related and matching terms, the corresponding path and the received keywords is generated. As seen from FIG. 4, the search result in the operation map is "dataset, Analyze, Descriptive Statistics, Frequencies" along the path shown in the dotted arrow line. The terms "dataset, Analyze, Descriptive Statistics, Frequencies" represent different operational steps in sequence. Thus, the terms in sequence in the operation map may reproduce the operational steps which occurred before the defect was encountered.

In addition to the operation steps reproduced, the description of the defect may also comprise a problem. The problem may be obtained from the keywords to the questionnaire. For above example, the problem is "Up button, can't work". If the problem could not be obtained from the questionnaire, it could be inferred. Since the problem normally occurs in the last step by default, according to the operation sequence or path, the user could infer that there is problem with "Statistics". Up to now, a simple defect description including the reproduced steps and problem is generated.

Figure 6A:
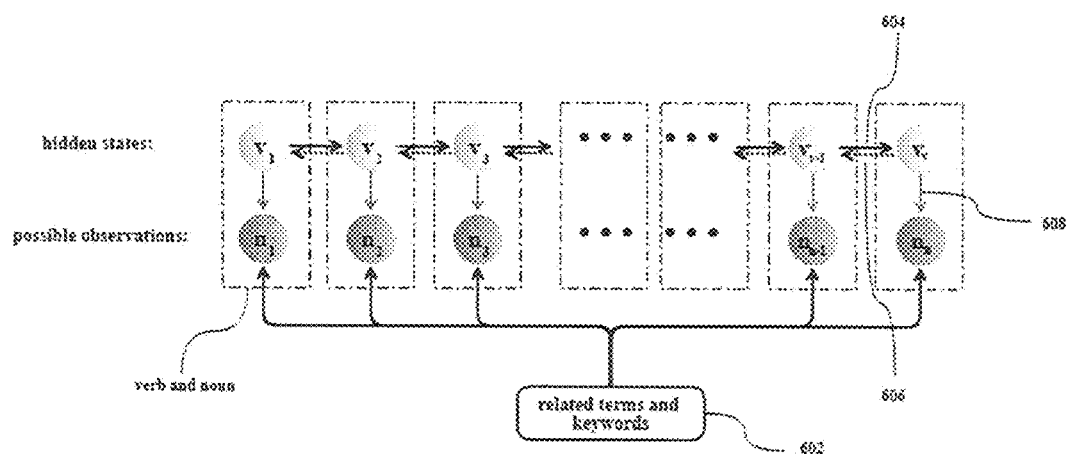
FIG. 6A illustrates an example of enhanced Hidden Markov Model (HMM) in which one or more verb-noun pairs are generated according to an embodiment of the present invention.
Figure 6B:
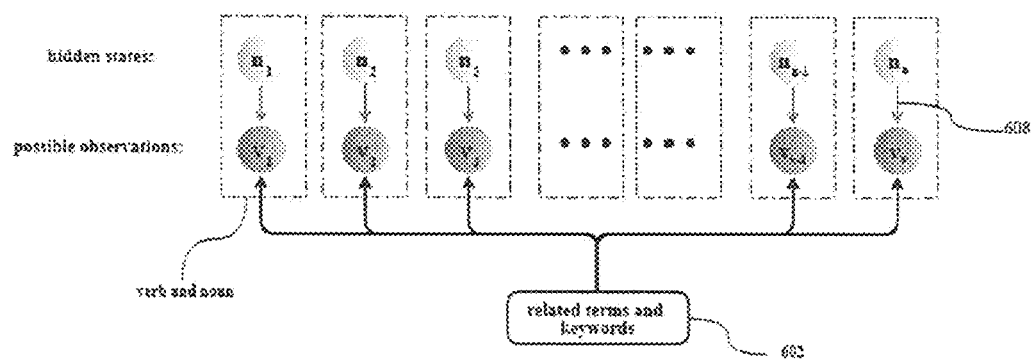
FIG. 6B illustrates an example of enhanced HMM in which one or more noun-verb pairs are generated according to an embodiment of the present invention.
Figure 7:
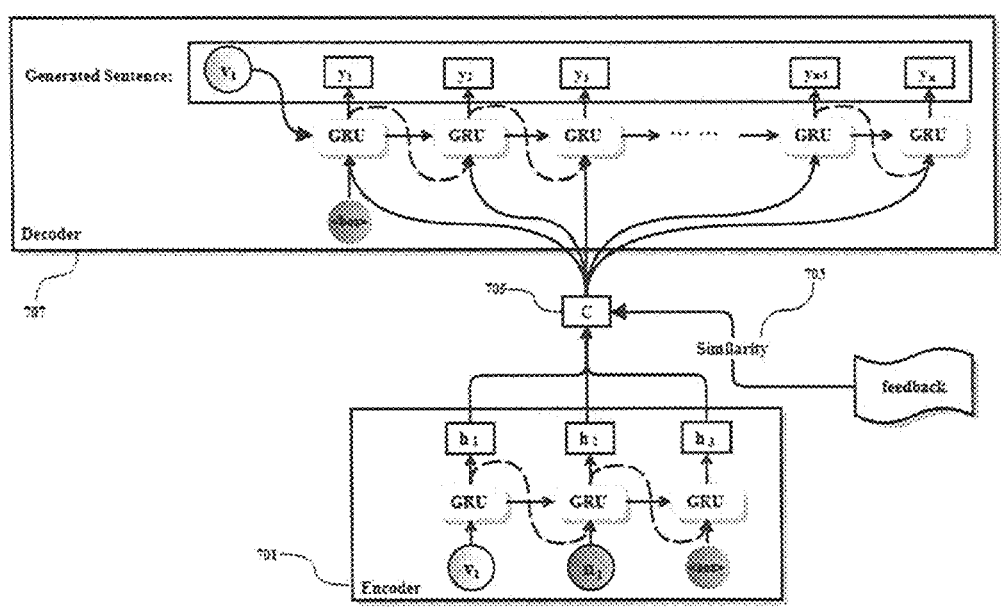
FIG. 7 illustrates an example of enhanced Encoder-Decoder model in which a sentence based on the verb-noun pair or the noun-verb pair is generated according to an embodiment of the present invention.

Further, in order to generate the defect description more automatically and make it close to human natural language, according to an embodiment of the present invention, as shown in FIG. 6A, verb-noun pairs may be generated with the enhanced Hidden Markov Model (HMM). Similarly, noun-verb pair may also be generated with the enhanced MINI as shown in FIG. 6B. According to another embodiment of the present invention, as shown in FIG. 7, the verb-noun pair or the noun-verb pair is put into the enhanced Encoder-Decoder model to generate a sentence to describe the defect automatically, which is close to human natural language.

FIGS. 6A and 6B provide an illustration of the verb-noun pairs and the noun-verb pairs generated with the enhanced Hidden Markov Model (HMM) according to one embodiment. HMM is a statistical model used to describe a Markov process with hidden unknown parameters. The model is used to determine the hidden sequence from observable sequence. An enhanced HMM model is used in the embodiments of the present invention and the improvement is mainly focused on two aspects. On the one hand, the enhanced MINI model is used to search the verb that best matches the noun or the noun that best matches the verb. On the other hand, the enhanced HMM model comprises an inverse phase as indicated by the dotted arrow 606 in FIG. 6A to sort the verb-noun pairs in order of the operations associated with respective verbs in the verb-noun pairs, that is, to produce the logical order/sequence between the generated verb-noun pairs. Such as, "Select-Analyze" occurs after "Open-Employee dataset.csv" and "Select-Analyze" occurs after "Select-Descriptive Statistics" and so on. The existing application of HMM algorithm only has positive phase and is easy to fall into a logic error.

Referring now to FIG. 6A, the input to the enhanced HMM model is a series of nouns, including $n_1, n_2, n_3 \ldots n_n$. Nouns are from the keywords the user input and the terms searched for in the operation map. For the previously mentioned example, the nouns include "Frequencies, Statistics, dataset, Analyze, Descriptive Statistics". Verbs may be found from the keywords/terms inputted by the user and the operation map, especially from the "action level" in the operation map. Specifically, for the previously mentioned example, the verb is found from the terms "can't work, open, select, choose, enable, etc.". In FIG. 6A, an observable sequence is $n_1, n_2, n_3 \ldots n_n$ and a hidden sequence is $v_1, v_2, v_3 \ldots v_n$ which is corresponding to the nouns.

In order to find a verb which matches a noun to generate a verb-noun pair, a transformation between verb and verb may be determined. This transformation is based on two probability matrices. One is the positive transition probability matrix 604, which indicates the probability that one verb will be transferred to the next verb. The other is the reverse transition probability matrix 606, which indicates the probability that a verb will infer the previous verb. The transformation between nouns and verbs is calculated by a transmit transfer matrix 608, and 608 represents the probability that a verb corresponds to the possible noun.

The value of the probability mentioned above is calculated by following mathematical formula in which the definition "C—inverse state-transition matrix:" together with the part of "Inverse phase" are the improvement to the existing HMM model and are corresponding to 606 shown in FIG. 6A.

Definitions

V—the set of all possible verb states,
N—the set of all possible noun observations.
$V=v_1, v_2, v_3, \ldots, v_M$, $N=n_1, n_2, n_3, \ldots, n_K$,
M—the number of possible verb states,
K—the number of possible noun states
I—state sequence. Its length is T,
O—observation sequence corresponding to I
$I=(i_1, i_2, i_3, \ldots, i_T)$ $O=(o_1, o_2, o_3, \ldots, o_T)$
A—state-transition matrix:

$$A=[a_{ij}]_{M \times M}$$

i=1, 2, 3, . . . , M j=1, 2, 3, . . . , M
Probability of transitioning to state $v_j$ at time t+1 under the condition of $v_i$ state at time t $$a_{ij}=P(i_{t+1}=v_j|i_t=v_i)$$

C—inverse state-transition matrix:

$$C=[c_{ij}]_{M \times M}$$

i=1, 2, 3, . . . , M j=1, 2, 3, . . . , M
At time t, the probability of transitioning to state $v_j$ at time t−1 under the condition of state $v_i$ $$c_{ij}=P(i_{t-1}=v_j|i_t=v_i)$$

B—observation probability matrix:

$$B=[b_j(u)]_{M \times K}$$

At time t, the probability of generating noun observation $n_u$ under $v_j$ condition:

$$b_j(u)=P(o_t=n_u|i_t=v_j)$$

π—Initial state probability vector:

$$\pi=(\pi_i)$$

$$\pi_i=P(i_1=v_i)$$

HMM model: $\lambda=(A, B, C, \pi)$
Enhanced Viterbi algorithm:
Input: HMM model $\lambda=(A, B, C, \pi)$ and observation $O=(o_1, o_2, o_3, \ldots, o_T)$ Output: the best path $I^{*'}=(i_1^{*''}, i_2^{*''}, i_3^{*''}, \ldots, i_T^{*''})$
Positive phase:
(1) Initialization:

$\delta_1(i)=\pi_i b_i(o_1)$ $\psi_1(i)=0$ (2) Recursive. For t=2, 3, ..., T:

$\delta_t(i) = \max_{1 \le j \le M} [\delta_{t-1}(j) a_{ji}] b_i(o_t)$ $\psi_t(i) = \underset{1 \le j \le M}{\arg\max}[\delta_{t-1}(j) a_{ji}]$ (3) Termination conditions:

$P^* = \max_{1 \le i \le M} [\delta_T(i)]$ $i_T^* = \underset{1 \le i \le M}{\arg\max}[\delta_T(i)]$ (4) Optimal path backtracking, for t=T−1, T−2, ..., 1:

$i_t^* = \psi_{t+1}(i_{t+1}^*)$

Get the positive optimal path: $I^* = (i_1^*, i_2^*, i_3^*, \ldots, i_T^*)$
Inverse phase:
(1) Initialization:

$I^* = (i_1^*, i_2^*, i_3^*, \ldots, i_T^*)$ $\delta_T'(i) = \delta_T(i)$

Recursive. For t=T−1, T−2, ..., 1:

$\delta_t'(i) = \max_{1 \le j \le M} [\delta_{t+1}'(j) c_{ji}] b_i(o_t)$ $\alpha_t(i_t^*) = \max(\delta_{t-1}(j) a_{j i_{t+1}^*})$ $\alpha_t'(i_t^*) = \max(\delta_{t-1}(j) a_{j i_{t+1}^*})$ (3) Comparison and output:
If $\alpha_t(i_t^*) > \alpha_t'(i_t^*)$:$i^{*''}=i_t^*$ else $i^{*''}=i_t^{*''}$
(4) Final output: $I^{*''}=(i_1^{*''}, i_2^{*''}, i_3^{*''}, \ldots, i_T^{*''})$ Similarly, referring now to FIG. 6B, the enhanced HMM model may also be used to find a noun which matches a verb to generate a noun-verb pair. The difference is that the observable sequence is $v_1, v_2, v_3 \ldots v_n$ and the hidden sequence is $n_1, n_2, n_3 \ldots n_n$ under this situation. At the same time, there is no need to guarantee the sequence for the generated noun. As such, the converse process shown in FIG. 6A is not required in FIG. 6B.

In addition, besides the generated verb-noun pairs and/or noun-verb pairs, there may be fixed pair entered by the user. For above example, the user has input a noun-verb pair: "Up button can't work". Under this case, there is no need to generate verb for "Up button" or generate noun for "can't work".

For the previously mentioned example, the verb-noun pairs are generated by the enhanced HMM model (also include the fixed pair) as below:

a. Open—Employee dataset.csv
b. Select—Analyze
c. Select—Descriptive Statistics
d. Select—Frequencies
e. Choose—Statistics
f. Up button—can't work It shall be understood that the enhanced HMM model is used to generate verb-noun pairs and the noun-verb pairs according to an embodiment of the present invention, other suitable models or algorithms can also be applied to the embodiments of the present invention.

Referring now to FIG. 7, which illustrates an example of enhanced Encoder-Decoder model in which a sentence based on the verb-noun pair or the noun-verb pair is generated according to an embodiment of the present invention. One application of the Encoder-Decoder model is in the field of machine translation, such as inputting Chinese to Encoder, then outputting the translated English in Decoder. In an embodiment of the method of the present invention, an enhanced Encoder-Decoder model is used to generate a sentence with a verb-noun pair and/or a noun-verb pair which is generated in the enhanced MEW model shown in FIGS. 6A and 6B. On the one hand, in the existing Encoder-Decoder model, the length of input is uncertain. In the present enhanced Encoder-Decoder model, only the verb-noun pair and noun-verb pair and the symbol "<cos>" are input, and the speed of the operation is relatively faster. At the same time, the verb-noun pair and the noun-verb pair is expanded into a sentence that conforms to human natural language. On one hand, C 701 shown in FIG. 7 is a vector that connects the encoder and the decoder, and in the existing Encoder-Decoder model, C 701 is the average of the weight of hl to h3. However, in the present enhanced Encoder-Decoder model, in addition to receiving hl to h3, C 701 also receives the pre-trained score referred to as similarity 703, which is pre-trained and provided by the feedback shown in FIG. 8.

As shown in FIG. 7, the encoder 701 accepts three inputs: a verb $v_1$, a noun $n_1$, and an end identifier <eos>. After using three gated recurrent units (GRUs), the GRUs are combined with similarity 703 to form a vector C 705. C 705 contains information on the three inputs. The decoder 707 accepts three inputs: the verb $v_1$, the identifiers <bos> and the vector C 705. If the first word of the generated sentence is fixed as the verb $v_1$, that is, if the verb-noun pair is input, then the first word of each generated sentence is the corresponding verb and the generated sentence will reproduce the operational step. Similarly, if the first word is fixed as noun $n_1$, that is, if the noun-verb pair is input, then the sentence regarding problem/issue description may be generated. Thereafter, the noun that is closest to the noun $n_1$ in the grammar analysis may be determined and replaced if the output sentence did not contain the noun $n^1$ in the input verb-noun pair. In addition, to describe the defect directly in terms of the software product, the generated word is replaced by the term in the operation map which is most relevant to it.

Furthermore, according to one embodiment, after inputting the verb-noun pair and/or noun-verb pair generated in the enhanced HEIM model shown in FIGS. 6A and 6B, the sentence describing the defect may be automatically generated as below, wherein sentences 1-5 are the reproduced operational steps and sentence 6 is the problem encountered:
1. Open-Employee dataset.csv—Open the 'Employee dataset.csv' dataset.
2. Select-Analyze—Select Analyze title.

3. Select-Descriptive Statistics—Select the Descriptive Statistics subtitle.
4. Select-Frequencies—Select Frequencies function.
5. Choose-Statistics—Choose Statistics tab.
6. Up button—can't work—The problem is that the 'Up' button can't work.

Figure 8:
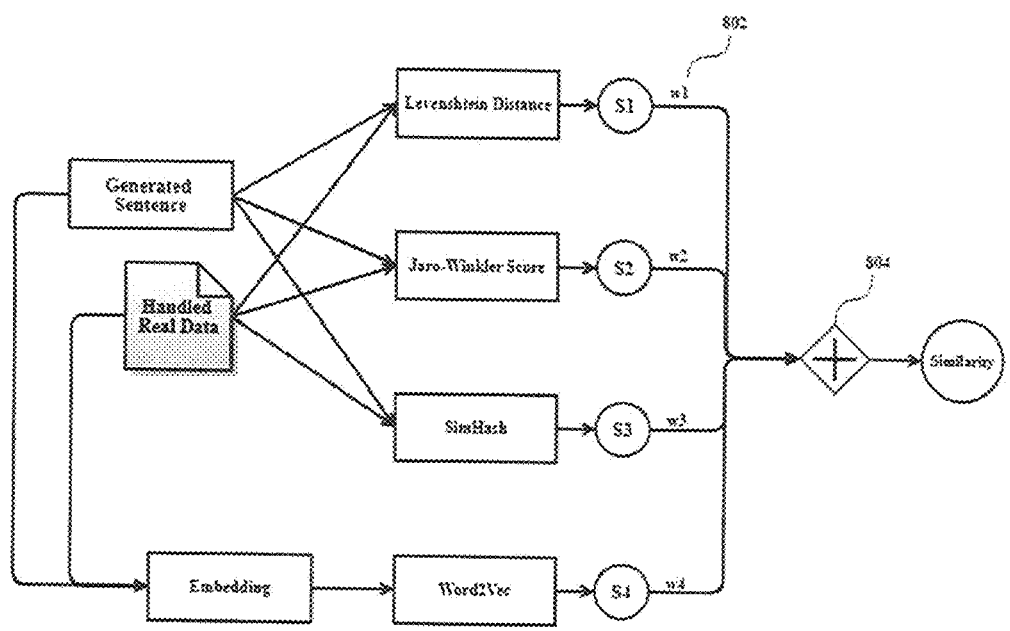
FIG. 8 illustrates an example of the process of the feedback to generate a Similarity according to an embodiment of the present invention.

FIG. 8 illustrates an example of the process of the feedback shown in FIG. 7 to generate a similarity according to an embodiment of the present invention. For the above example, the generated sentences and the real sentences as below:

The generated sentences:
1. Open the 'Employee dataset.csv' dataset.
2. Select Analyze title.
3. Select the Descriptive Statistics subtitle.
4. Select Frequencies function.
5. Choose Statistics tab.
6. The problem is that the 'Up' button can't work.

The real sentences:
1. Open "Employee dataset.csv"
2. Select Analyze title
3. Select the Descriptive Statistics subtitle
4. Select Frequencies
5. In Statistics tab, the 'Up' button can't work.

The above example is only one case. In practice, there may be other cases for training. In the process of training, the generated sentences and the real sentences (i.e. the real data for each case) are input into the feedback to output the value of 'Similarity' which indicates the degree of similarity between the generated sentence and real sentences. After 'Similarity' is fed back to the enhanced Encoder-Decoder model shown in FIG. 7, the enhanced Encoder-Decoder model updates its parameters based on the 'Similarity' to output the sentences which is close to natural language.

The main purpose of the feedback is to compare the difference between the generated sentence and the real sentence. This difference is calculated including two parts. The first part is to calculate the literal distance by using Levenshtein Distance, JaroWinkler Score, and SimHash. The second part is to calculate the semantic similarity. After embedding of two sentences is built, Word2vec is used to calculate the semantic similarity, basing on all the similarity weights 802, then average weight 804 is returned to the enhanced Encoder-Decoder model as Similarity. The four weights $w_1$, $w_2$, $w_3$ and $w_4$ construct a nonlinear regression model for training, which is not discussed herein in detail.

It shall be understood that the enhanced Encoder-Decoder model is used to generate a sentence according to an embodiment of the present invention, other suitable model or algorithm now known or to be developed can also be applied to the embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
   receiving, by one or more processors, input including a description of at least one defect associated with a computer application, wherein the description comprises one or more keywords;
   searching, by the one or more processors, an operation map for one or more terms matching the one or more keywords from the description of the at least one defect, wherein the one or more terms describe operations of the computer application;
   in response to determining a match between the one or more keywords and the one or more terms associated with the operation map, determining, by the one or more processors, a sequence of operational steps performed prior to the at least one defect, wherein the sequence of operational steps comprise an operational path corresponding to the one or more terms; and
   in response to determining the match and the corresponding operational path, generating and presenting, by the one or more processors, defect description information based on the match, the corresponding operational path, and the one or more keywords, wherein generating the defect description information comprises at least one of determining a matched verb for each noun in the one or more terms and the one or more keywords to generate one or more verb-noun pairs and determining a matched noun for each verb in the one or more terms and the one or more keywords to generate one or more noun-verb pairs, and generating a sentence describing the at least one defect based on at least one of the one or more verb-noun pairs and the one or more noun-verb pairs with an enhanced encoder-decoder model.

2. The method of claim 1, wherein determining a matched verb for each noun further comprises:
   sorting the one or more verb-noun pairs in an order associated with the sequence of operational steps associated with respective verbs in the one or more verb-noun pairs.

3. The method of claim 1, further comprising:
   generating a similarity between the sentence generated and a real sentence to feed back into the enhanced encoder-decoder model.

4. The method of claim 1, wherein the searching is conducted using an A* algorithm.

5. A computer program product comprising a computer readable storage medium having a computer readable program stored therein, wherein the computer readable program, when executed on a computing device, causes the computing device to:
   receiving, by one or more processors, input including a description of at least one defect associated with a computer application, wherein the description comprises one or more keywords;
   searching, by the one or more processors, an operation map for one or more terms matching the one or more keywords from the description of the at least one defect, wherein the one or more terms describe operations of the computer application;
   in response to determining a match between the one or more keywords and the one or more terms associated with the operation map, determining, by the one or more processors, a sequence of operational steps performed prior to the at least one defect, wherein the sequence of operational steps comprise an operational path corresponding to the one or more terms; and
   in response to determining the match and the corresponding operational path, generating and presenting, by the one or more processors, defect description information based on the match, the corresponding operational path, and the one or more keywords, wherein generating the defect description information comprises at least one of determining a matched verb for each noun in the one or more terms and the one or more keywords to generate one or more verb-noun pairs and determining a matched noun for each verb in the one or more terms and the one or more keywords to generate one or more noun-verb pairs, and generating a sentence describing the at least one defect based on at least one of the one or more verb-noun pairs and the one or more noun-verb pairs with an enhanced encoder-decoder model.

6. The computer program product of claim 5, wherein determining a matched verb for each noun further comprises:
sorting the one or more verb-noun pairs in an order associated with the sequence of operational steps associated with respective verbs in the one or more verb-noun pairs.

7. The computer program product of claim 5, further comprising:
generating a similarity between the sentence generated and a real sentence to feed back into the enhanced encoder-decoder model.

8. The computer program product of claim 5, wherein the searching is conducted using an A* algorithm.

9. A system, comprising:
a processor; and
a memory coupled to the processor, wherein the memory comprises instructions, executed by the processor, wherein the instructions executed by the processor comprises:
receiving, by one or more processors, input including a description of at least one defect associated with a computer application, wherein the description comprises one or more keywords;
searching, by the one or more processors, an operation map for one or more terms matching the one or more keywords from the description of the at least one defect, wherein the one or more terms describe operations of the computer application;
in response to determining a match between the one or more keywords and the one or more terms associated with the operation map, determining, by the one or more processors, a sequence of operational steps performed prior to the at least one defect, wherein the sequence of operational steps comprise an operational path corresponding to the one or more terms; and
in response to determining the match and the corresponding operational path, generating and presenting, by the one or more processors, defect description information based on the match, the corresponding operational path, and the one or more keywords, wherein generating the defect description information comprises at least one of determining a matched verb for each noun in the one or more terms and the one or more keywords to generate one or more verb-noun pairs and determining a matched noun for each verb in the one or more terms and the one or more keywords to generate one or more noun-verb pairs, and generating a sentence describing the at least one defect based on at least one of the one or more verb-noun pairs and the one or more noun-verb pairs with an enhanced encoder-decoder model.

10. The system of claim 9, wherein determining a matched verb for each noun further comprises:
sorting the one or more verb-noun pairs in an order associated with the sequence of operational steps associated with respective verbs in the one or more verb-noun pairs.

11. The system of claim 9, further comprising:
generating a similarity between the sentence generated and a real sentence to feed back into the enhanced encoder-decoder model.

12. The system of claim 9, wherein the searching is conducted using an A* algorithm.

* * * * *